(No Model.)
F. S. KERR.
ATTACHMENT FOR FEED BAGS.
No. 479,646. Patented July 26, 1892.
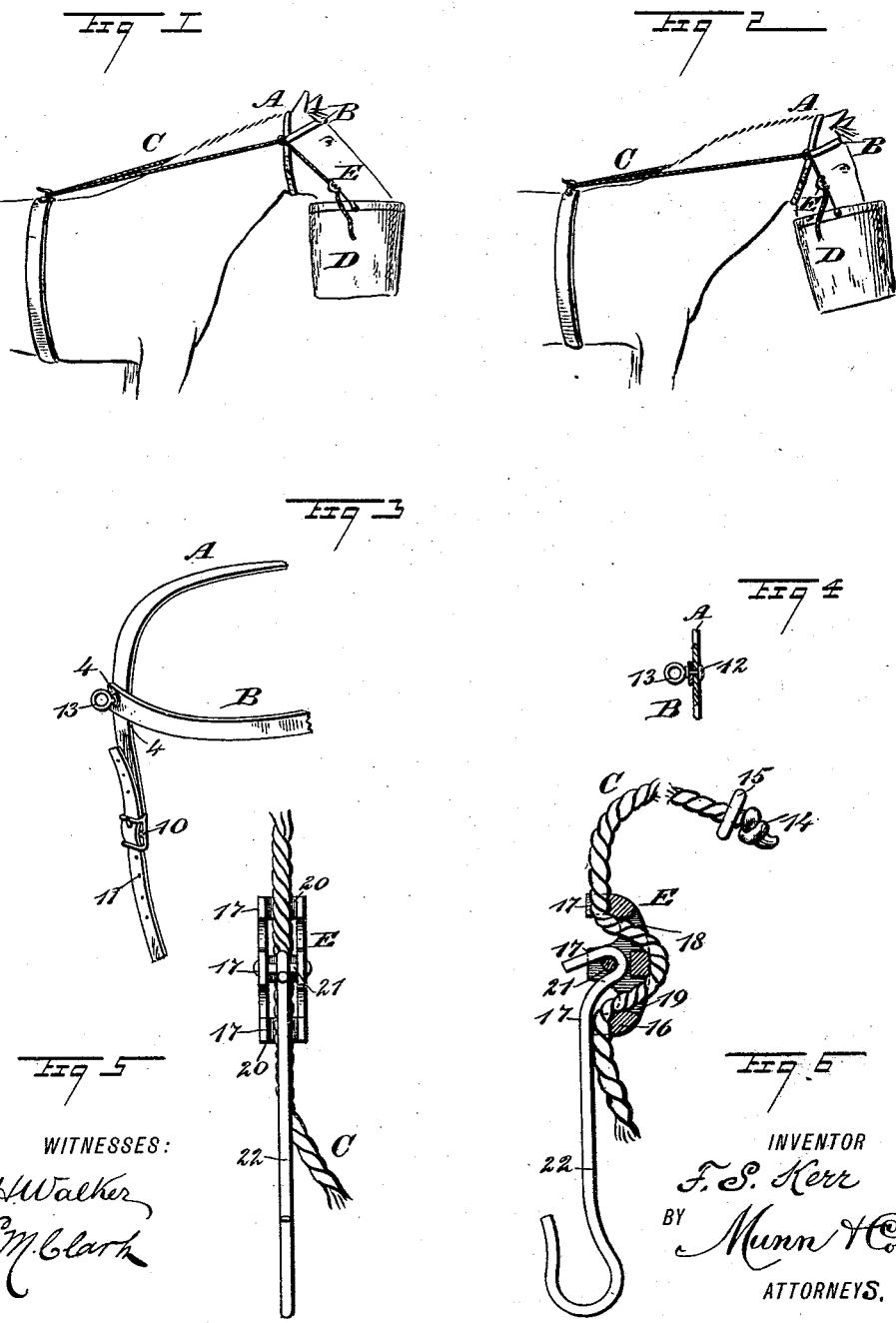
WITNESSES:
H. Walker
E. M. Clark
INVENTOR
F. S. Kerr
BY Munn & Co.
ATTORNEYS.

UNITED STATES PATENT OFFICE.

FRED S. KERR, OF NEW YORK, N. Y.

ATTACHMENT FOR FEED-BAGS.

SPECIFICATION forming part of Letters Patent No. 479,646, dated July 26, 1892.

Application filed May 22, 1891. Serial No. 393,725. (No model.)

*To all whom it may concern:*

Be it known that I, FRED S. KERR, of New York city, in the county and State of New York, have invented a new and useful Attachment to Feed-Bags, of which the following is a full, clear, and exact description.

My invention relates to an attachment for feed-bags, and has for its object to provide a device capable of attachment to any feed-bag, and also capable of attachment to any convenient portion of a harness.

A further object of the invention is to so construct the device that when attached to a feed-bag and harness the horse may feed in a manner similar to feeding in a stall, as the feed will be at all times within reach of its mouth, and in feeding, the head may be elevated so as to bring the mouth some distance from the feed and near the upper portion of the bag, thereby affording ventilation during the process of feeding.

A further object of the invention is to provide a device of simple, durable, and economic construction capable of ready attachment to and detachment from the bag and the harness of the animal.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a side elevation of the device and a bag, illustrating it as applied to an animal and the animal's head as elevated from the bottom of the bag or from the feed. Fig. 2 is a similar view illustrating the animal's head while down in the bag and the mouth in contact with the feed. Fig. 3 is a perspective view of a portion of the neck and head straps, illustrating the construction and connection thereof. Fig. 4 is a section taken, practically, on the line 4 4 of Fig. 3. Fig. 5 is a front elevation of the take-up device employed in connection with the attachment, and Fig. 6 is a vertical sectional view through the said device.

In carrying out the invention a neck-strap A and a head-strap B are employed for attaching the device to the animal's head. The neck-strap A is an ordinary strap, being provided with a buckle 10 at one end and a series of apertures 11 at the opposite end. The head-strap is a short strap adapted to pass around the forehead, and its ends are secured to the throat-strap, the attachment being effected through the medium of rivets 12, as shown in Fig. 4, said rivets having integral with or attached to their outer ends eyes 13.

In connection with the straps A and B a strap or rope C is employed, one end of which is adapted for attachment in any suitable or approved manner to any desired form of feed bucket or bag D.

A preferred means for attaching one end to the bucket is shown in Fig. 5, and consists in knotting the end of the rope, as illustrated at 14, and placing a washer 15 in front of the knot. This end of the strap or rope is not adjustable; but the opposite end is.

At the adjustable end of the strap or rope a take-up E is located, which take-up consists, preferably, of a block having one convex face 16 and three teeth or spurs 17, formed in the opposite face. The block is provided with two apertures 18 and 19, which extend from the convexed face—one at each side of the center—through the space between the outer and the intermediate teeth or spurs. The outer teeth are provided with concave recesses 20, as illustrated in Fig. 5, and a recess is produced in the central tooth or spur of sufficient depth to receive a pin 21, upon which pin the upper end of a hook 22 is pivoted. The hook 22 is adapted to be passed through an eye in the feed-bag or is placed in engagement with a stud secured to the bag.

In operation the straps A and B are secured one around the animal's neck and the other across the forehead, as shown in Figs. 1 and 2. The button end 14 of the strap or rope is secured to the bag and is passed through the ring 13 at one side of the neck-strap, thence around the turret or saddle-hook, hames, or other convenient point of the harness, and through the opposite eye or ring 13. Thence the rope or strap is passed downward in engagement with the recessed surface to the upper tooth of the take-up E, then through the upper opening 18 to an engagement with the curved back of the take-up, thence through the opening 19 to an engagement with the recessed surface of the lower tooth or spur, as is shown in Fig. 4. This having been accomplished, the hook 22 is attached to the feed-bag. When the bag has thus been placed in position around the animal's mouth, the strap or rope C is drawn through the take-up until the animal can readily reach the feed in the bag and the rope or strap will remain in this position by frictional contact with the take-up.

When the attachment has been placed upon a bag and harness and to an animal, as above described, when the animal carries down its head the bag is drawn up, so that the mouth will be brought in engagement with the feed. After having taken a proper mouthful, when the animal raises its head to masticate the feed the mouth of the animal will be at the top of the feed-bag, yet within it, as shown in Fig. 1, as when the animal brings up his head the bag travels downward. Thus the animal may feed in the same manner as when in a stall, as its mouth is not at all times buried in the feed, and it is enabled to take up the feed at will until the supply has been exhausted, and to masticate said feed when its head is raised to a natural position under such an operation, and this without spilling any of the feed.

Having thus described my invention, I claim as new and desire to secure by Letters Patent—

The combination, with a neck-strap, a head-strap having its ends attached to the neck-strap, guides secured to the straps at their junction, and a feed-bag, of a strap or rope adapted to support the bag, said strap or rope being passed through the guides and one end firmly attached to the bag, a tension device attached to the opposite end of the rope or strap, which tension device consists of a block having an inner convexed side, an opposite toothed side, and apertures extending from one side to the other and through which the rope is passed, and a link pivoted in the block and adapted for attachment to the bag, as and for the purpose specified.

FRED S. KERR.

Witnessess:
J. FRED. ACKER,
C. SEDGWICK.